United States Patent [19]
Kirkland

[11] 3,782,075
[45] Jan. 1, 1974

[54] COMPLETELY POROUS MICROSPHERES FOR CHROMATOGRAPHIC USES

[75] Inventor: Joseph J. Kirkland, Wilmington, Del.

[73] Assignee: E. I. du Pont de Nemours and Company, Wilmington, Del.

[22] Filed: Apr. 7, 1972

[21] Appl. No.: 242,038

[52] U.S. Cl. .................... 55/67, 55/386, 210/198 C
[51] Int. Cl. ............................................ B01d 15/08
[58] Field of Search .................. 55/67, 74, 75, 386, 55/387, 389; 210/31 C, 198 C, 502, 507

[56] References Cited
UNITED STATES PATENTS

| | | | |
|---|---|---|---|
| 3,535,265 | 10/1970 | Baron et al. | 210/198 C |
| 3,505,785 | 4/1970 | Kirkland | 55/67 |

*Primary Examiner*—John Adee
*Attorney*—Wilkin E. Thomas, Jr.

[57] ABSTRACT

This invention relates to an improved packing material for chromatographic columns, prepared from a powder of uniform-sized porous microspheres composed of a plurality of interconnected colloidal oxide particles.

16 Claims, 5 Drawing Figures

COMPLETELY POROUS MICROSPHERES FOR CHROMATOGRAPHIC USES

BACKGROUND OF THE INVENTION

1. Field of the Invention

This invention relates to an improvement in chromatography and chromatographic columns. More specifically, it relates to a novel packing material for chromatographic columns which comprises a powder of uniform-sized, completely porous microspheres.

2. Discussion of the Prior Art

One type of packing used in chromatographic applications consists of a powder of completely solid particles. Such a support has the disadvantage of providing a minimum surface area for the processes involved.

Completely porous bodies of controlled porosity, such as those disclosed in British Patent 1,171,651 for Porous Silica Grains which issued to M. LePage et al, have also been used as chromatographic supports, but these particles suffer from the fact that they incorporate, as an integral part of the particle, non-siliceous impurities consisting of ions of alkali snd alkali earth metals, such as $Na^+$. Bodies containing such impurities have a non-homogeneous surface composition, which may cause a solute in the carrier phase to be preferentially adsorbed at some sites of the surface relative to others.

Completely porous particles without such impurities have been made by spray drying a sol of colloidal silica, as disclosed in U.S. Pat. No. 3,301,635, which issued to H. E. Bergna et al on Jan. 31, 1967. This spray drying technique, however, produces particles of non-uniform size which are generally larger than 20 microns. Both of these factors detract from the usefulness of such particles in chromatographic applications.

The primary difficulty with those completely porous particles produced by spray drying techniques is that they are non-uniform in size. Because of the difference in time required for the mobile phase to diffuse into and out of particles of varying size, the use of a powder of non-uniform particles is equivalent to the use of a non-homogeneous support medium. Furthermore, the incrase in resolution in modern chromatographic techniques has to a large extent been dependent on an increase in the efficiency of column packing. Packing efficiency is decreased when the particles are of non-uniform size. While it is possible to produce a powder with a large disparity in particle size and then separate the particles into uniform sizes, no convenient way to do this has been found when the particles are below 20 microns in size.

The other difficulty with spray dried products is the size of the particles formed. Large particles, with pores lying deep within the particle, create deep pools of stagnant mobile phase which result in band spreading and loss of resolution in the chromatographic instrument. This difficulty has been reduced by using superficially porous particles such as those disclosed in U.S. Pat. No. 3,505,785 which issued to J. J. Kirkland on Apr. 14, 1970. In these superficially porous particles, the core of the particle is a solid sphere which is surrounded by several monolayers of smaller silica particles. An increased surface area is provided by the small outer particles and the stagnant pools of mobile phase are reduced by virtue of the fact that the central core of the particles is impervious. The use of a solid central core, however, is an inefficient method of removing the problems caused by deep pores because it requires an increase in the size of the particles to achieve an incrase in the surface area.

It is an object of the present invention to provide a powder, for use as a chromatographic packing material, which is optimized for the type of separation desired. The desirability of using small particles in liquid chromatography has been discussed by various authors including L. R. Snyder in the Journal of Chromatographic Science 7, 352 (1969) and J. H. Knox in the same journal at page 614. Furthermore, the desirability of using small porous particles has been discussed by authors such as J. J. Kirkland in Analytical Chemistry 43, 36A (1971). Nowhere, however, has there been disclosed or suggested a chromatographic packing material, particularly liquid chromatographic packing material with an ideal combination of properties for the type of separation desired achieved by using uniform size particles which are not only small, spherical and porous, but which also have a controlled pore size and generally a relatively large surface area. It is the object of this invention to provide such a packing material.

SUMMARY OF THE INVENTION

According to this invention, there is provided a chromatographic packing material comprising a powder of uniform-sized porous microspheres having an average diameter of about 0.5 to about 20 microns, preferably 1.0 to 10 microns, substantially all of which have a diameter ranging from about 0.5 to about 1.5, preferably 0.8 to 1.2, times the average diameter of the microspheres in the powder. The microspheres themselves consist essentially of a plurality of uniform-sized colloidal particles having a refractory metal oxide surface arranged in a interconnected three-dimensional lattice defining a plurality of internal pores having uniform and controlled dimension. The size of the pores is controlled by the size of the colloidal particles used to form the microspheres and the surface area of the microsphere is controlled by the amount of sintering used to impart strength to the particles. In the preferred embodiment, the specific surface area of said microparticles is only slightly less than the specific surface area of the colloidal particles from which they are formed, and the colloidal particles occupy less than 50% of the total volume of the microparticle, with the remaining volume being occupied by the interconnected pores. The colloidal particles can be composed of materials selected from the group consisting of silica, alumina, zirconia, titania, ferric oxide, antimony oxide, tin oxide or combinations thereof.

BRIEF DESCRIPTION OF THE DRAWINGS

The invention can better be understood and explained by reference to the following figures.

DETAILED DESCRIPTION OF THE INVENTION

Figure 1:
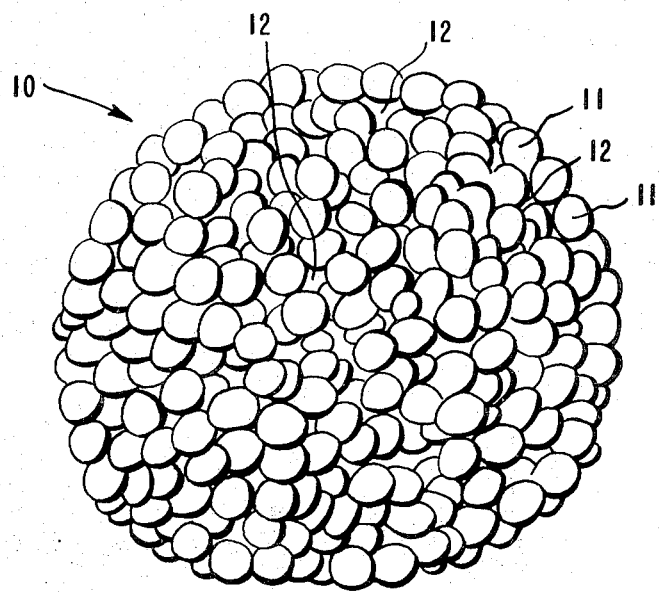
FIG. 1 shows a single porous powder particle useful as the chromatographic packing of the present invention. The microsphere is generally indicated by the number 10, the colloidal ultimate particles by the number 11 and the pores in the microspheres by the number 12.
Figure 2:
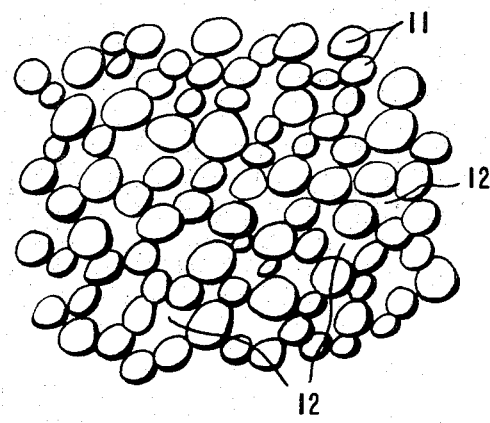
FIG. 2 is a diagrammatic view of a section of a microparticle showing the lightly coalesced colloidal particles 11 separated by uniform-sized pores 12.

A single microsphere 10 which comprises the powder used in the chromatographic column of the present invention is shown diagrammatically in FIG. 1. A portion of this microsphere is shown diagrammatically in FIG. 2. The microspheres are composed of a plurality of colloidal particles 11 which are interconnected in a three-dimensional matrix which occupies less than 50% of the volume of the microsphere. The remainder of the microsphere is composed of uniform-sized pores 12.

The microparticles used in the powder are characterized by the fact that they are spherical, and have an average diameter of about 0.1 to about 20 microns, preferably about 1.0 to about 10 microns. Furthermore, they are uniform in size which means that less than 5% of the particles in the powder have a diameter less than about 0.5 times the average diameter of the microspheres in the powder, and less than 5% have a diameter greater than about 1.5 times the average diameter. Preferably this range is about 0.8 to about 1.2 times the average diameter. Finally the microspheres have controlled pore dimensions and a relatively large surface area and pore volume. By control of the sintering used to provide strength to the particle, the specific surface area of the microspheres can be as high as about 90% of the specific surface area of the colloidal particles from which they are made and the microspheres will still have a strength sufficient to allow them to be used without fracturing. The size of the pores contained in the microparticles will depend primarily on the size of the colloidal particles used to produce the microspheres.

The average diameter of the pores in the microspheres of the present invention, at a pore diameter of 1,000 A, is about half the calculated diameter of the ultimate particles making up the microsphere. This diameter is calculated from the equation $$D = 6000/dA$$

when $D$ is the calculated diameter of the ultimate particle, $d$ is the density of the solid inorganic material (e.g., 2.2 grams per cm.$^3$ for amorphous $SiO_2$) and $A$ is the specific surface area of the microsphere, as determined by nitrogen adsorption, as disclosed by F. M. Nelson and F. T. Eggerstein in Analytical Chemistry 30, 1387 (1958). At 100 A, the pore diameter is about equal to the colloidal particle diameter and at about 50A it is about one and a half times the colloidal particle diameter.

By using colloidal particles, as defined below, the microparticles of the present invention will have a diameter in the range of about 50 A to about 2500 A or more narrowly, about 75 A to about 1000 A.

Microparticles useful as the packing material in the chromatographic column or resolving zone of the present invention can be made by a process disclosed in co-pending U.S. patent application Ser. No. 242,039 for Uniform Oxide Microspheres and a Process for Their Manufacture, which was filed by R. K. Iler and H. J. McQueston on the same day as this application. A detailed discussion will be found in that application, the disclosure of which is hereby incorporated by reference into this specification, but for convenience, a short explanation of the process will be given here. In this process, an aqueous sol of a refractory oxide particle is formed and mixed with a copolymerizable mixture of urea and formaldehyde or melamine and formaldehyde. Polymerization is initiated and coacervation of the organic material into microspheres containing the colloidal particles occurs. The microspheres are then solidified, collected, washed and dryed. At this stage, the microspheres consist of a plurality of colloidal particles embedded in a sphere of polymer. The organic material is then burned off at a temperature sufficient to oxidize the organic constituents without melting the inorganic material. Generally, this is about 550°C. The porous microspheres are then sintered at an elevated temperature for a time sufficient to strengthen the microparticles to the point where they will not fracture in use. A good indication of whether enough sintering has occurred is when the specific surface area of the microsphere has been reduced to a value which is at least 10% less than the surface area of the colloidal particles themselves.

The formation of the microspheres proceeds by association of the inorganic colloidal particles with the organic coacervate. It is postulated that the extreme uniformity in both the size of the microspheres and the distribution of the colloidal particles within the microsphere depend on an interaction between hydroxyl groups on the surface of the colloidal particles and portions of the polymer chain. For this reason, at least prior to the onset of polymerization, the colloidal particles must have hydroxyl groups on their surface equivalent to a hydrated oxide surface. The interior of the particles may consist of some other material, but the surface must be capable of being hydroxylated. For the purpose of the present invention, the inorganic colloid must also be one that will leave a solid residue after the polymer is removed. The preferred colloids, then, are refractory metal colloids which do not melt or otherwise decompose at about 500°C. This is about the lowest temperature that can be used to burn out the organic material. Generally, however, the refractory particles will have a melting point greater than 1000°C., but lower melting oxides can be used if the polymer constituent is removed by slow oxidation at lower temperatures. Examples of refractory metal oxides that can be used in the practice of the present invention are: alumina, zirconia, titania, ferric oxide, antimony oxide, tin oxide or combinations thereof, with the preferred material being silica.

The ultimate particles of the present invention must be colloidal in size. For purposes of the present invention, this means that at least two of the dimensions of these particles must be in the range of 3 to 500 millimicrons and the other dimension must be in the range of 3 to 1000 millimicrons. Particles having one dimension greater than a micron or having any dimension greater than about 0.1 times the diameter of the microsphere, are difficult to incorporate into spherical microparticles since the large dimension interferes with the formation of discrete spherical units.

The organic components must be initially soluble in water and miscible with the inorganic colloid without flocculating or dissolving it at the pH at which the reaction occurs. The polymer when formed must be insoluble in water. While a variety of organic materials may be suitable, it appears that the highest degree of uniformity in both particle size and pore size distribution occurs when a copolymerizing mixture of urea and formaldehyde or melamine and formaldehyde is used. Urea and formaldehyde in mol ratio of about 1 to about 1.2 or 1.5 and a pH of about 1.0 to 4.5, and melamine and formaldehyde in mol ratio of about 1 to about 3 and a pH of about 4 to about 6 are suitable.

The ratio of organic material to inorganic material should be such that after polymerization, the precipitated particles contains about 10 to about 90% by weight of the inorganic component. Expressed in terms of volume, the percent volume of inorganic material should range from about 10 to about 50%. To obtain coherent porous spheres after the organic matter is burned out, there must be a sufficiently high concentration of inorganic particles within the matrix to link together into a three-dimensional matrix. This network may be very fragile, when obtained at 550°C., but if heated, undisturbed at higher temperatures, to initiate sintering, the porous spheres develop strength. To insure that sufficient sintering has occurred to provide the desired strength, the particles are generally sintered at an elevated temperature, usually above 900°C., which is sufficiently high to reduce the specific surface area of the particle by at least 10% below the value for the colloidal particles from which they are formed.

The microspheres of the present invention have uniform pores, the diameter of which depends on the size of the colloidal particles used in their preparation and the volume ratio of the organic polymer to the inorganic material used. The larger the particles, the larger the pores between them, and the greater the proportional volume of organic polymer in the microspheres when formed, the more open the network of inorganic particles and the wider the pores.

In optimum dimensions, these microspheres exhibit superior performance in the various forms of liquid chromatographic applications; liquid-liquid, liquid-solid and exclusion. For example, highly efficient liquid-solid (thin layer and column) chromatography can be carried out with microspheres having a diameter in the 1.0 to 10.0 micron range made from colloidal particles in the 3–100 millimicron range. Very high speed liquid-liquid chromatography can be practiced by coating microspheres having a diameter in the 1.0 to 10.0 micron range and made from colloidal particles in the 20 to 80 millimicron range, with appropriate stationary liquid phases. These particles may also be reacted with ion exchange media to produce supports for ion exchange chromatography. They may be reacted with reagents to produce chromatographic packings with chemically bonded stationary phases. Highly efficient gas-liquid and gas-solid chromatographic separation can be carried out with microspheres having a diameter in the range of 50 to 150 microns, made from colloidal particles in the 50 to 200 millimicron range. The range of useful microparticle diameters, therefore, extends from about 0.5 to about 500 microns.

Since the microspheres prepared from each size colloidal particle consist of a totally porous structure having a narrow range of pore size, by varying the size of the colloidal particles, microspheres having a predetermined range of relatively homogeneous pore sizes can be produced. Silica microspheres with pores of known dimension can be used for high speed exclusion chromatographic separation (gel permeation and gel filtration) i.e., separation based on the differential migration of molecules based on molecular size or molecular weight considerations. The small particle size promotes rapid mass transfer so that carrier velocities much higher than normal can be used while still maintaining equilibrium in the diffusion-controlled interaction which takes place with the pores in the totally porous structure. The strong, rigid characteristics of the microspheres permit the use of very high pressures (at least up to 6000 psi) without particle degradation or deformation. The spherical nature of the particles permit the packing of columns with large number of theoretical plates, which is of particular importance in the separation of small molecules. Of prime consideration in the exclusion chromatographic process is the internal volume of the particles used in the separation. Pore volume is relatively high in the microspheres, usually from 50–65% (measured by $N_2$ adsorption by B.E.T. method), depending on pore size, which is comparable to that found for the porous glasses and the porous organic gels widely used for exclusion chromatography.

It is predicted that the silica microspheres will be useful in gel filtration separations in aqueous systems and will be particularly useful for the separation of small polar molecules. Microspheres having pores in the 50 to 2500 A range should permit the high-speed exclusion chromatographic separation of a large variety of compounds in both aqueous and nonaqueous systems.

One of the factors that affects column efficiency is the packing of the column or structure which constitutes the resolving zone. The microparticles of the present invention have a distinct advantage in this respect because their spherical and uniform size contributes to the ease with which they can be packed into a dense bed. The most common packing practice is dry packing. I have found, however, that the column performance can be significantly improved if, during the dry packing process, the column is subjected to a vertical motion of controlled frequency while the dry packing material is fed to the column at a constant rate.

Dry packing is different when the particles are less than about 20 microns in diameter. Another process, high pressure slurry packing, has been used for such particles with some success. I have found that the uniform porous silica microspheres of the present invention can be easily and conveniently high-pressure slurry-packed into columns after producing a stable aqueous suspension. This suspension is accomplished by ultrasonic mixing of the packing in degassed 0.001 M $NH_4OH$. The adsorbed $NH_4^+$ places a positive charge on each particle, resulting in repulsion of the particles and stabilization of the slurry with a minimum of aggregation. This approach works particularly well with the totally porous silica microspheres of the present invention because of the uniform particle size. The ammonia-stabilized slurry is rapidly pumped into column blanks at 6000 psi in the usual manner. Water is removed from the packing by pumping through absolute methanol. The packing is then equilibrated with the solvent or solvent/stationary phase system that is to be employed. For instance, for liquid-solid chromatography, the methanol-treated microspheres are conditioned with ½ water-saturated ether to adjust the water content within the structure. Columns packed by this ammonia-stabilized slurry approach have proved to be reproducible, not only in efficiency, but in retention and selectivity characteristics. Such columns are stable and apparently can be used at pressures at least as high as 6000 psi.

As a result of the spherical shape and narrow range of particle size, microsphere columns have relatively high specific permeability K°, as shown by the comparison in Table I.

TABLE I

Specific Permeability of High Performance LC Columns

| Packing Type | Particle Size, $\mu$ | $K°$ Cm$^2$ × 10$^8$ |
|---|---|---|
| "Zipax"* surface porosity particles | <37 | 2.2 |
| Diatomaceous earth, Kieselguhr | 5–15 | 0.20 |
| Silica gel | 5–10 | 0.092 |
| Porous silica microspheres | 8–9 | 0.16 |
| Porous silica microspheres | 5–6 | 0.077 |

* Registered trademark of the E.I. duPont de Nemours & Co.

The close-sized porous silica microspheres show higher permeability (less resistance to flow) than irregularly-shaped and wider size range silica gel and diatomaceous earth particles of the same size. Pressure requirements for microsphere columns are sufficiently low so as to be handled by most of the pumps currently being used by modern liquid chromatography. One meter microsphere columns of 5–6 $\mu$ particles can be operated at carrier velocities of 0.5 cm./sec. with pressures of only about 2400 psi. Such a column would exhibit >20,000 effective plates, which should permit very difficult separations.

A more meaningful measure of column performance is the Performance Factor suggested by L. R. Snyder in "Gas Chromatography 1970" published by The Institute of Petroleum (page 81). This Performance Factor is equal to $(K/0.5)^{1-n/2}/D$ when K is the column permeability, is the carrier viscosity, and D is calculated from $H = Dv^n$, where $v$ is the carrier velocity, $H$ is the plate height, $D$ is a column constant and n is an exponant. Table II compares the effective plates/sec. and the Performance Factors for a variety of column packings.

TABLE II

| Packing type | Particle size ($\mu$) | Effective plates per second | Performance factor |
|---|---|---|---|
| Zipax | <37 | 10 | 37 |
| Silica Gel | 5–10 | 15 | 28 |
| Diatomaceous earth Kieselguhr | 5–15 | | 16 |
| Porous Silica microspheres | 8–9 | 14 | 126 |
| Porous silica microspheres | 5–6 | 23 | 170 |

The higher the performance factor, the better the separating ability of the column. It can be seen from the table that the porous silica microspheres of the present invention compare quite favorably with the packings of the prior art.

The operation and advantages of the present invention will now be shown by the following examples.

EXAMPLE 1

High-speed liquid-liquid chromatography has been carried out using the 5–6 $\mu$ particles with approximately 350 A pores. These particles, which were made from particles having an average diameter of 50 millimicrons, by the process described in Example 1 of the Iler application discussed above (attorney's docket number IPD–14) have a nitrogen surface area of about 40 m$^2$/g. They were selected because of the relatively large pores which allows the ready access of solute molecules to the stationary phase within the totally porous structure. A 250 mm × 3.2 mm i.d. stainless steel column was prepared using the high pressure slurry packing procedure discussed above. The packed porous particles were then filled with $\beta,\beta'$-oxydipropionitrile (BOP) using an in situ technique. In situ coating of column packing may be carried out by any procedure that results in the homogeneous dispersion of stationary phase throughout the packing. A simple, covenient technique for in situ coating of packings, which appears generally applicable, is to pass through the prepacked column the stationary phase dissolved in a good solvent. This step, conveniently carried out at high flow rates, is continued until an equilibrium situation exists within the column. Next, a second solvent, which is miscible with the first carrier and immiscible with the stationary phase, is slowly passed through the column. Under these conditions, the stationary phase is homogeneously precipitated in the internal pores of the support, but is eliminated from the space between the particles when the carrier velocity is increased. If high concentrations of the stationary phase in the initial solvent are used (30–40% by weight) the pores may be completely filled with the precipitated stationary phase.

Figure 3:
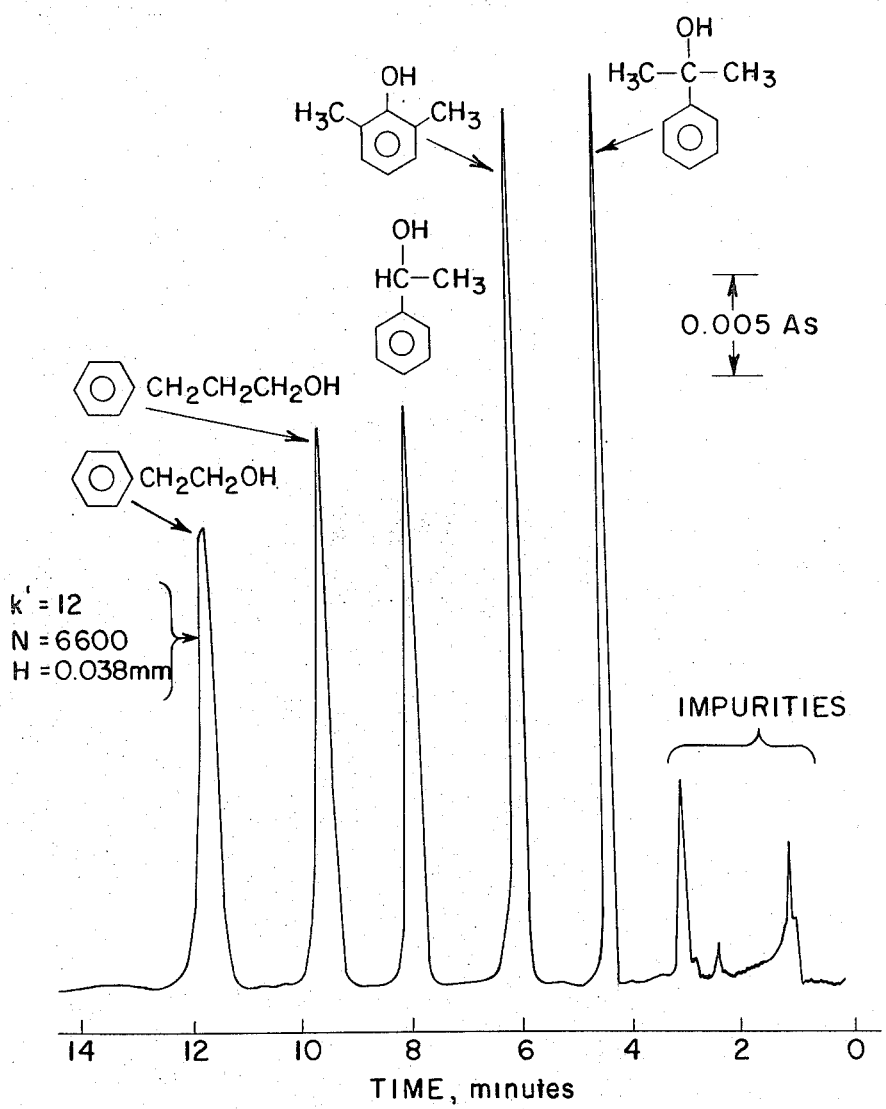
FIG. 3 shows a high efficiency separation of a mixture of hydroxylated aromatic compounds using liquid-liquid chromatography and one of the chromatographic columns of the present invention.

This column of silica porous microspheres, contained about 30% by weight of stationary liquid after this treatment. FIG. 3 shows a high efficiency separation of a mixture of hydroxylated aromatic compounds using such a microsphere column. The carrier was hexane, at a pressure of 600 psi, a flow of 1.0 ml/min. The separation was carried out at a temperature of 27°C. with 4 microliters of solution. The last peak, 2-phenylethanol ($k' = 12$), exhibited 6600 theoretical plates (N), or a plate height (H) of 0.038 mm at a carrier velocity of 0.44 cm/sec. Relatively low pressure was needed to operate the column at this flow rate. At a carrier velocity of 3.3 cm/sec. (5000 psi, flow 7.7 cc/min.) this last peak elutes in 73 seconds with a plate height of 0.11 mm, and a $N_{eff}/t$ (effective plates/sec) = 23.

EXAMPLE 2

Figure 4:
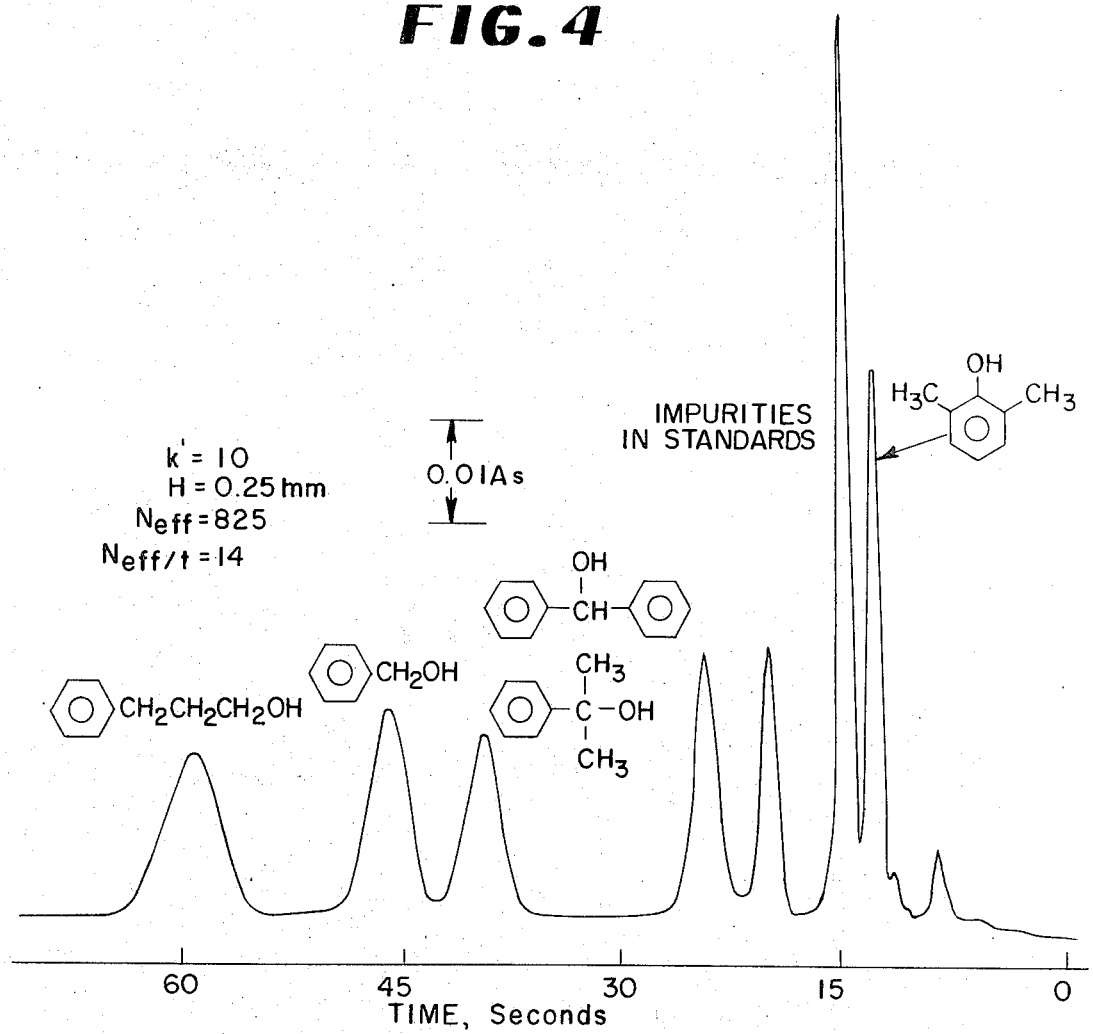
FIG. 4 shows a high efficiency separation of a mixture of hydroxylated aromatic compounds using liquid-solid chromatography and one of the chromatographic columns of the present invention.

High speed liquid-solid chromatographic separations have been carried out with 8–9 micron silica microspheres, from particles having an average diameter of 5 millimicrons, made according to Example 1 in the Iler application mentioned above (attorney's docket number IPD–14). These particles have pores of about 75 A and a nitrogen surface area of about 350 m$^2$/g. FIG. 4 shows a high efficiency separation of a mixture of hydroxylated aromatic compounds using a column and conditions similar to that of Example 1 except that the pressure was 2000 psi, temperature was 27°C., the flow rate was 10.5 ml/min and the carrier fluid was dichloromethane (half water saturated).

In this separation, seven major compounds were resolved in about 65 seconds, the last peak, 3-phenyl-1-ethanol (capacity factor $k' \cong 10$) showing the value of 825 effective plates or 14 plates per second $N_{eff}/t$ at a carrier velocity of 4.7 cm/sec. At a carrier velocity of 9.5 cm/sec. (4000 psi) this column exhibited 18 and 24 effective plates/sec., respectively for 3-phenylethanol and benzyhydrol ($k' \cong 4$).

EXAMPLE 3

Figure 5:
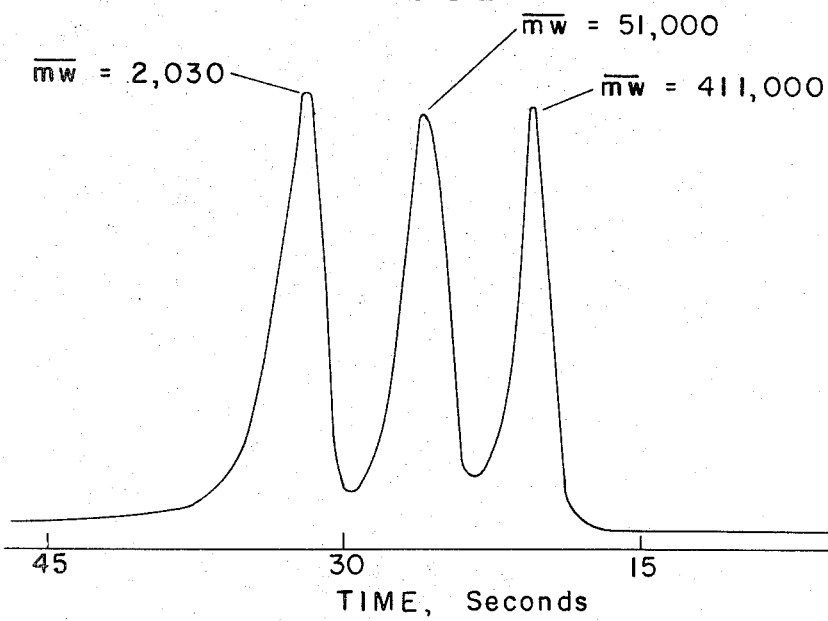
FIG. 5 shows a high efficiency separation of three polystyrene fractions using exclusion chromatography and one of the chromatographic columns of the present invention.

High speed exclusion separation has been carried out using 5–6 μ particles with approximately 350 A pores. These particles were made from small particles having an average diameter of 50 millimicrons, by the process of the Iler application described above (attorney's docket number of IPD–14). FIG. 5 shows three polystyrene fractions (molecular weight 2,030, 51,000, and 411,000) separated essentially to base line in about 38 seconds with a 250 mm ×2.1 mm i.d. column containing <0.5 g. of packing. The carrier fluid was tetrahydrofuran at a temperature of 60°C., a pressure of 1625 psi and a flow rate of 1.0 ml/min. Such a separation of polystyrene fractions is unique.

I claim:

1. In an apparatus for use in chromatographic separation comprising a region through which materials to be separated are passed, the improvement wherein said region comprises a plurality of uniform-sized porous microspheres having an average diameter of about 0.5 to about 20 microns, substantially all of said microspheres having a diameter ranging from about 0.5 to about 1.5 times the average diameter of the microspheres in said powder, said microspheres consisting essentially of a plurality of uniform-sized colloidal particles, having a refractory metal oxide surface, arranged in a interconnected three-dimensional lattice, said colloidal particles occupying less than 50% of the volume of said microspheres with the remaining volume being occupied by interconnected pores having a uniform pore size distribution.

2. The apparatus of claim 1 in which said microspheres have an average diameter of about 1.0 to about 10 microns.

3. The apparatus of claim 2 in which substantially all of said microspheres have a diameter ranging from about 0.8 to about 1.2 times the average diameter of the microspheres in said powder.

4. The apparatus of claim 2 in which said colloidal particles are composed of materials selected from the group consisting of silica, alumina, zirconia, titania, ferric oxide, antimony oxide, tin oxide and combinations thereof.

5. The apparatus of claim 2 in which said colloidal particles are composed of silica.

6. The apparatus of claim 2 in which said colloidal particles occupy less than 50% of the volume of said microspheres.

7. The apparatus of claim 6 in which said microspheres have a specific surface area greater than about 75% of the surface area of the colloidal particles from which they are made.

8. The apparatus of claim 2 in which said microspheres are modified with a sorptively active material.

9. In a process for performing chromatographic separation comprising contacting the materials to be separated in a carrier phase with a resolving zone, the improvement wherein said resolving zone comprises a plurality of uniform-sized porous microspheres having an average diameter of about 0.5 to about 20 microns, substantially all of said microspheres having a diameter ranging from about 0.5 to about 1.5 times the average diameter of the microspheres in said powder; said microspheres consisting essentially of a plurality of uniform-sized colloidal particles, having a refractory metal oxide surface, arranged in a interconnected three-dimensional lattice, said colloidal particles occupying less than 50% of the volume of said microspheres with the remaining volume being occupied by interconnected pores having a uniform pore size distribution.

10. The process of claim 9 in which said microspheres have an average diameter of about 1.0 to about 10 microns.

11. The process of claim 10 in which substantially all of said microspheres have a diameter ranging from about 0.8 to about 1.2 times the average diameter of the microspheres in said powder.

12. The process of claim 10 wherein said colloidal particles are composed of materials selected from the group consisting of silica, alumina, zirconia, titania, ferric oxide, antimony oxide, tin oxide and combinations thereof.

13. The process of claim 10 wherein said colloidal particles are composed of silica.

14. The process of claim 10 wherein said colloidal particles occupy less than 50% of the volume of said microspheres.

15. The process of claim 14 wherein said microspheres have a specific surface area greater than about 75% of the surface area of the colloidal particles from which they are made.

16. The process of claim 10 wherein said microspheres are modified with a sorptively active material.

* * * * *